United States Patent [19]
Gohn

[11] Patent Number: 5,853,066
[45] Date of Patent: Dec. 29, 1998

[54] CONVERTIBLE TREE STAND

[76] Inventor: Barry E. Gohn, 122 Old Commons Rd., Windsor, Pa. 17366

[21] Appl. No.: 44,413

[22] Filed: Mar. 19, 1998

[51] Int. Cl.⁶ .................................................. A01M 31/02
[52] U.S. Cl. .............................. 182/20; 182/116; 182/187
[58] Field of Search .................................... 182/116, 187, 182/20, 188

[56] References Cited

U.S. PATENT DOCUMENTS

| | | | |
|---|---|---|---|
| 4,905,792 | 3/1990 | Wilson | 182/187 |
| 5,538,101 | 7/1996 | Kempf | 182/116 |

Primary Examiner—Alvin Chin-Shue

[57] ABSTRACT

A new convertible tree stand for converting a tree stand into a game carrier. The inventive device includes a platform portion having a generally circular configuration. The platform portion has an aperture through a central portion thereof for receiving a tree therein. The platform portion is comprised of a pair of separable sections. The separable sections are coupled together by opposed male and female hinges. A ladder portion extends upwardly through the platform portion for coupling with the tree. The ladder portion includes an upper vertical portion having a pair of cleats disposed on an interior surface thereof for engaging the tree. The pair of cleats have a rope member extending around the tree. The upper vertical portion has a seat portion pivotally coupled to a front surface thereof. A lower end of the upper vertical portion has an upper horizontal portion extending outwardly therefrom. A free end of the horizontal portion has an angular portion extending downwardly therefrom to a position below the platform portion. A free end of the angular portion has an upper ladder segment coupled thereto. A lower end of the upper ladder segment has a lower ladder segment pivotally coupled thereto.

5 Claims, 2 Drawing Sheets

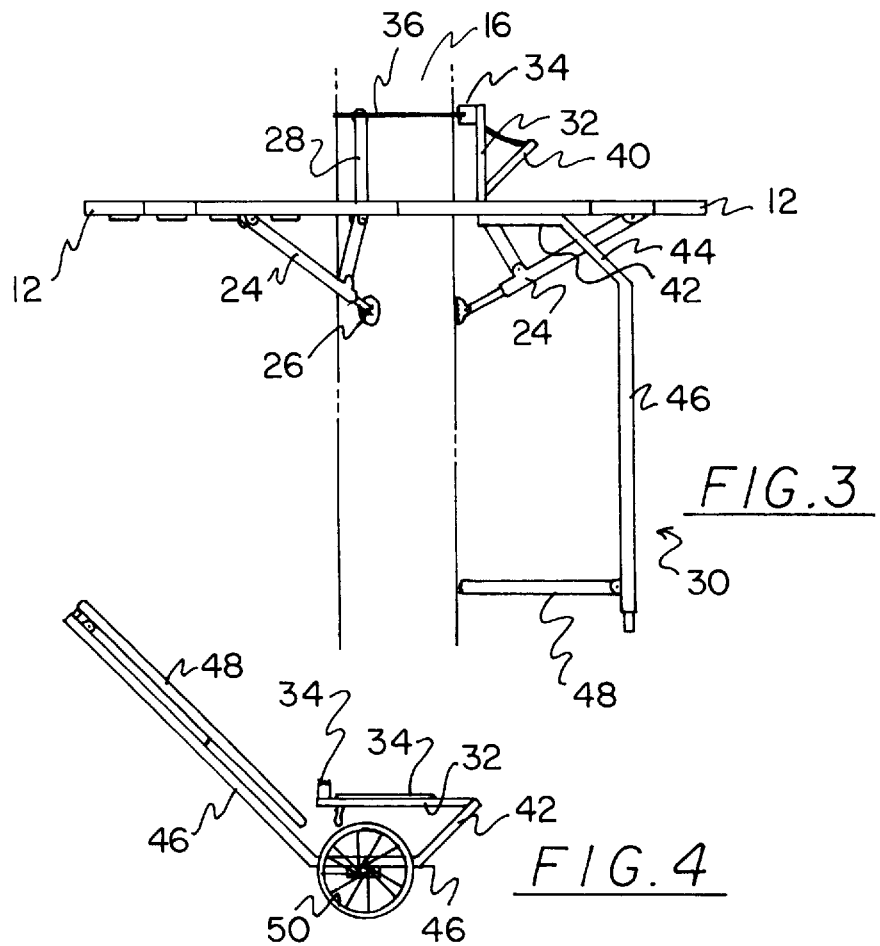
FIG. 3
FIG. 4
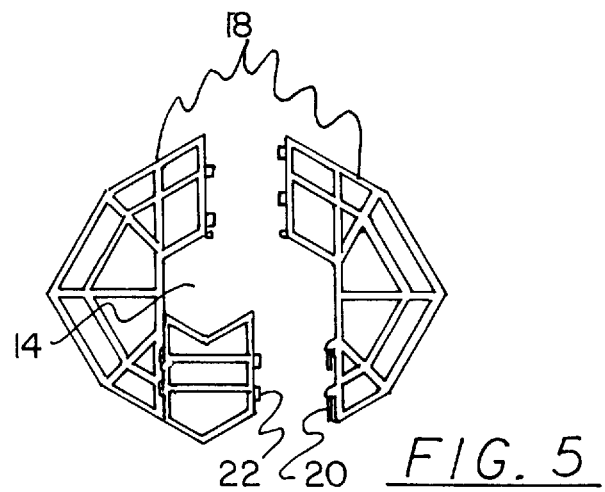
FIG. 5

CONVERTIBLE TREE STAND

BACKGROUND OF THE INVENTION

1. Field of the Invention

The present invention relates to hunting apparatuses and more particularly pertains to a new convertible tree stand for converting a tree stand into a game carrier.

2. Description of the Prior Art

The use of hunting apparatuses is known in the prior art. More specifically, hunting apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art hunting apparatuses include U.S. Pat. No. 5,433,291 to Shoestock, Sr.; U.S. Pat. No. 5,295,556 to Mullin; U.S. Pat. No. Des. 359,133 to Dull et al.; U.S. Pat. No. 5,282,520 to Walker; U.S. Pat. No. 4,321,982 to Strickland; and U.S. Pat. No. 5,314,042 to Adams.

While these devices fulfill their respective, particular objectives and requirements, the aforementioned patents do not disclose a new convertible tree stand. The inventive device includes a platform portion having a generally circular configuration. The platform portion has an aperture through a central portion thereof for receiving a tree therein. The platform portion is comprised of a pair of separable sections. The separable sections are coupled together by opposed male and female hinges. A ladder portion extends upwardly through the platform portion for coupling with the tree. The ladder portion includes an upper vertical portion having a pair of cleats disposed on an interior surface thereof for engaging the tree. The pair of cleats have a rope member extending around the tree. The upper vertical portion has a seat portion pivotally coupled to a front surface thereof. A lower end of the upper vertical portion has an upper horizontal portion extending outwardly therefrom. A free end of the horizontal portion has an angular portion extending downwardly therefrom to a position below the platform portion. A free end of the angular portion has an upper ladder segment coupled thereto. A lower end of the upper ladder segment has a lower ladder segment pivotally coupled thereto.

In these respects, the convertible tree stand according to the present invention substantially departs from the conventional concepts and designs of the prior art, and in so doing provides an apparatus primarily developed for the purpose of converting a tree stand into a game carrier.

SUMMARY OF THE INVENTION

In view of the foregoing disadvantages inherent in the known types of hunting apparatuses now present in the prior art, the present invention provides a new convertible tree stand construction wherein the same can be utilized for converting a tree stand into a game carrier.

The general purpose of the present invention, which will be described subsequently in greater detail, is to provide a new convertible tree stand apparatus and method which has many of the advantages of the hunting apparatuses mentioned heretofore and many novel features that result in a new convertible tree stand which is not anticipated, rendered obvious, suggested, or even implied by any of the prior art hunting apparatuses, either alone or in any combination thereof.

To attain this, the present invention generally comprises a platform portion having a generally circular configuration. The platform portion has an aperture through a central portion thereof for receiving a tree therein. The platform portion is comprised of a pair of separable sections. The separable sections are coupled together by opposed male and female hinges. A plurality of angular supports are pivotally secured to an underside of the platform portion. The lower ends of the angular supports include telescopic portions extending outwardly therefrom for engaging the tree. A plurality of strap members extend upwardly from the platform portion. The strap members are coupled with respect to the tree. A ladder portion extends upwardly through the platform portion for coupling with the tree. The ladder portion includes an upper vertical portion having a pair of cleats disposed on an interior surface thereof for engaging the tree. The pair of cleats have a rope member extending around the tree and coupling with upper ends of the plurality of strap members. The upper vertical portion has a seat portion pivotally coupled to a front surface thereof. A lower end of the upper vertical portion has an upper horizontal portion extending outwardly therefrom. A free end of the horizontal portion has an angular portion extending downwardly therefrom to a position below the platform portion. A free end of the angular portion has an upper ladder segment coupled thereto. A lower end of the upper ladder segment has a lower ladder segment pivotally coupled thereto. A pair of wheels are provided that are coupleable to the ladder portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new convertible tree stand apparatus and method which has many of the advantages of the hunting apparatuses mentioned heretofore and many novel features that result in a new convertible tree stand which is not anticipated, rendered obvious, suggested, or even implied by any of the prior art hunting apparatuses, either alone or in any combination thereof.

It is another object of the present invention to provide a new convertible tree stand which may be easily and efficiently manufactured and marketed.

It is a further object of the present invention to provide a new convertible tree stand which is of a durable and reliable construction.

An even further object of the present invention is to provide a new convertible tree stand which is susceptible of a low cost of manufacture with regard to both materials and labor, and which accordingly is then susceptible of low prices of sale to the consuming public, thereby making such convertible tree stand economically available to the buying public.

Still yet another object of the present invention is to provide a new convertible tree stand which provides in the apparatuses and methods of the prior art some of the advantages thereof, while simultaneously overcoming some of the disadvantages normally associated therewith.

Still another object of the present invention is to provide a new convertible tree stand for converting a tree stand into a game carrier.

Yet another object of the present invention is to provide a new convertible tree stand which includes a platform portion having a generally circular configuration. The platform portion has an aperture through a central portion thereof for receiving a tree therein. The platform portion is comprised of a pair of separable sections. The separable sections are coupled together by opposed male and female hinges. A ladder portion extends upwardly through the platform portion for coupling with the tree. The ladder portion includes an upper vertical portion having a pair of cleats disposed on an interior surface thereof for engaging the tree. The pair of cleats have a rope member extending around the tree. The upper vertical portion has a seat portion pivotally coupled to a front surface thereof. A lower end of the upper vertical portion has an upper horizontal portion extending outwardly therefrom. A free end of the horizontal portion has an angular portion extending downwardly therefrom to a position below the platform portion. A free end of the angular portion has an upper ladder segment coupled thereto. A lower end of the upper ladder segment has a lower ladder segment pivotally coupled thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention shown attached to a tree.

FIG. 4 is a side view of the present invention shown in a cart configuration.

FIG. 5 is a top plan view of the platform of the present invention shown in a disassembled orientation.

DESCRIPTION OF THE PREFERRED EMBODIMENT

Figure 1:
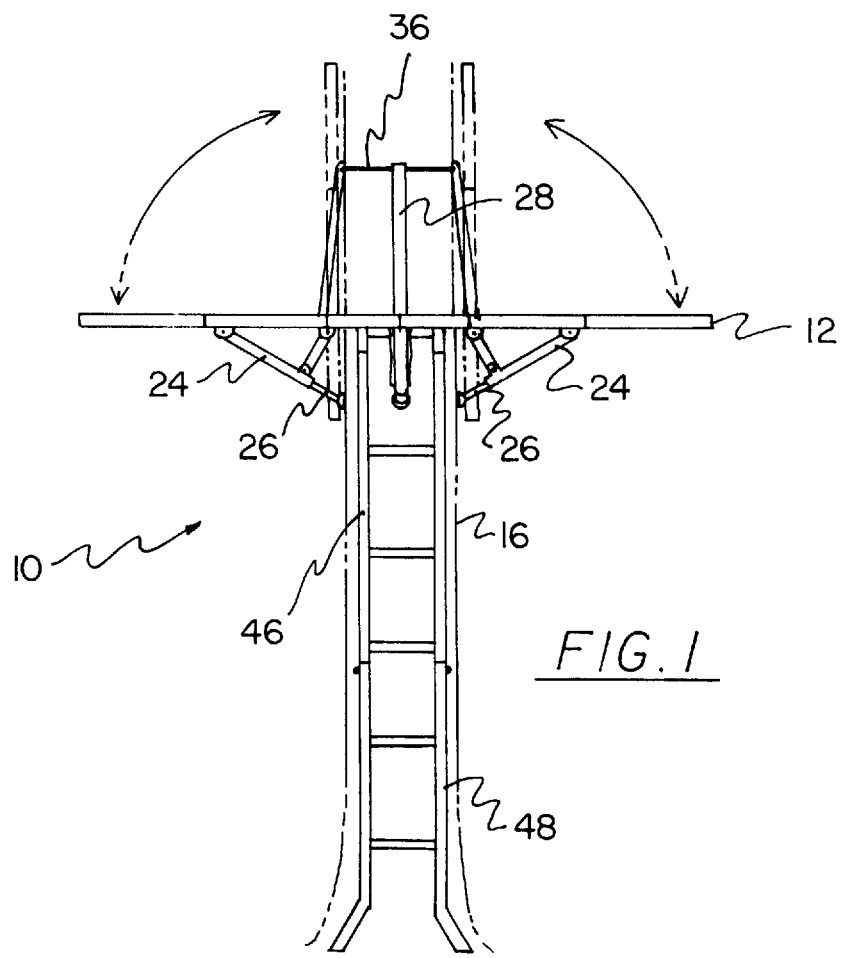
FIG. 1 is a front view of a new convertible tree stand according to the present invention shown attached to a tree.
Figure 2:
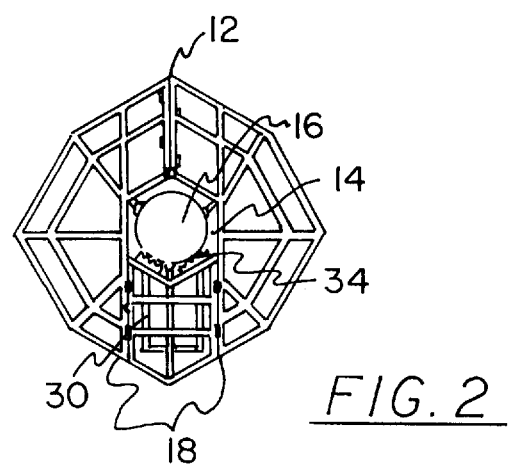
FIG. 2 is a top plan view of the present invention shown attached to a tree.

With reference now to the drawings, and in particular to FIGS. 1 through 5 thereof, a new convertible tree stand embodying the principles and concepts of the present invention and generally designated by the reference numeral 10 will be described.

As best illustrated in FIGS. 1 through 5, the convertible tree stand 10 comprises a platform portion 12 having a generally circular configuration. The platform portion 12 has an aperture 14 through a central portion thereof for receiving a tree 16 therein. The platform portion 12 is comprised of a pair of separable sections 18. The separable sections 18 are coupled together by opposed male 20 and female hinges 22.

A plurality of angular supports 24 are pivotally secured to an underside of the platform portion 12. The lower ends of the angular supports 24 include telescopic portions 26 extending outwardly therefrom for engaging the tree 16. The angular supports 24 prevent the platform portion 12 from sliding downwardly with respect to the tree 16.

A plurality of strap members 28 extend upwardly from the platform portion 12. The strap members 12 are coupled with respect to the tree 16.

A ladder portion 30 extends upwardly through the platform portion 12 for coupling with the tree 12. The ladder portion 30 includes an upper vertical portion 32 having a pair of cleats 34 disposed on an interior surface thereof for engaging the tree 16. The pair of cleats 34 have a rope member 36 extending around the tree 16 and coupling with upper ends of the plurality of strap members 28. The upper vertical portion 32 has a seat portion 40 pivotally coupled to a front surface thereof. A lower end of the upper vertical portion 32 has an upper horizontal portion 42 extending outwardly therefrom. A free end of the horizontal portion 42 has an angular portion 44 extending downwardly therefrom to a position below the platform portion 12. A free end of the angular portion 44 has an upper ladder segment 46 coupled thereto. A lower end of the upper ladder segment 46 has a lower ladder segment 48 pivotally coupled thereto.

A pair of wheels 50 are provided that arc coupleable to the ladder portion 30.

In use, the present invention can be converted from a tree stand as illustrated in FIGS. 1 and 3 to a game carrying cart as illustrated in FIG. 4. To convert, the ladder portion 30 is removed from the platform portion 12. The platform portion 12 is disassembled along with the angular supports 24 and the strap members 28. The ladder portion is then folded over as illustrated in FIG. 4. The wheels 50 arc then coupled with opposing sides of the angular portion 44, which will serve as the base for the carrying cart.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new convertible tree stand for converting a tree stand into a game carrier comprising, in combination:

a platform portion having a generally circular configuration, the platform portion having an aperture through a central portion thereof for receiving a tree therein, the platform portion being comprised of a pair of separable sections, the separable sections being coupled together by opposed male and female hinges;

a plurality of angular supports pivotally secured to an underside of the platform portion, the lower ends of the angular supports including telescopic portions extending outwardly therefrom for engaging the tree;

a plurality of strap members extending upwardly from the platform portion, the strap members to be coupled with respect to the tree;

a ladder portion extending upwardly through the platform portion for coupling with the tree, the ladder portion including an upper vertical portion having a pair of cleats disposed on an interior surface thereof for engaging the tree, the pair of cleats having a rope member for extending around the tree and coupling with upper ends of the plurality of strap members, the upper vertical portion having a seat portion pivotally coupled to a front surface thereof, a lower end of the upper vertical portion having an upper horizontal portion extending outwardly therefrom, a free end of the horizontal portion having an angular portion extending downwardly therefrom to a position below the platform portion, a free end of the angular portion having an upper ladder segment coupled thereto, a lower end of the upper ladder segment having a lower ladder segment pivotally coupled thereto; and a pair of wheels coupleable to the ladder portion.

2. A new convertible tree stand for converting a tree stand into a game carrier comprising, in combination:

a platform portion having a generally circular configuration, the platform portion having an aperture through a central portion thereof for receiving a tree therein, the platform portion being comprised of a pair of separable sections, the separable sections being coupled together by opposed male and female hinges;

a ladder portion extending upwardly through the platform portion for coupling with the tree, the ladder portion including an upper vertical portion having a pair of cleats disposed on an interior surface thereof for engaging the tree, the pair of cleats having a rope member for extending around the tree, the upper vertical portion having a seat portion pivotally coupled to a front surface thereof, a lower end of the upper vertical portion having an upper horizontal portion extending outwardly therefrom, a free end of the horizontal portion having an angular portion extending downwardly therefrom to a position below the platform portion, a free end of the angular portion having an upper ladder segment coupled thereto, a lower end of the upper ladder segment having a lower ladder segment pivotally coupled thereto.

3. The convertible tree stand as set forth in claim 2 and further including a plurality of angular supports pivotally secured to an underside of the platform portion, the lower ends of the angular supports including telescopic portions extending outwardly therefrom for engaging the tree.

4. The convertible tree stand as set forth in claim 2 and further including a plurality of strap members extending upwardly from the platform portion, the strap members to be coupled with respect to the tree.

5. The convertible tree stand as set forth in claim 2 and further including a pair of wheels which are coupleable to the ladder portion.

* * * * *